(12) United States Patent
Fujimoto

(10) Patent No.: US 10,266,018 B2
(45) Date of Patent: Apr. 23, 2019

(54) COMMUNICATION SYSTEM AND COMMUNICATION APPARATUS

(71) Applicants: AUTONETWORKS TECHNOLOGIES, LTD., Yokkaichi-shi, Mie (JP); SUMITOMO WIRING SYSTEMS, LTD., Yokkaichi-shi, Mie (JP); SUMITOMO ELECTRIC INDUSTRIES, LTD., Osaka-shi, Osaka (JP)

(72) Inventor: Takeshi Fujimoto, Yokkaichi (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 16/081,776

(22) PCT Filed: Feb. 22, 2017

(86) PCT No.: PCT/JP2017/006554
§ 371 (c)(1),
(2) Date: Aug. 31, 2018

(87) PCT Pub. No.: WO2017/159250
PCT Pub. Date: Sep. 21, 2017

(65) Prior Publication Data
US 2019/0061442 A1 Feb. 28, 2019

(30) Foreign Application Priority Data
Mar. 14, 2016 (JP) .................. 2016-049875

(51) Int. Cl.
*B60C 23/04* (2006.01)
*H04W 4/48* (2018.01)
(Continued)

(52) U.S. Cl.
CPC .......... *B60C 23/04* (2013.01); *H04B 1/3822* (2013.01); *H04W 4/38* (2018.02); *H04W 4/48* (2018.02); *H04W 4/80* (2018.02)

(58) Field of Classification Search
CPC ....... B60C 23/04; H04B 1/3822; H04W 4/38; H04W 4/48; H04W 4/80
See application file for complete search history.

(56) References Cited

U.S. PATENT DOCUMENTS 5,774,795 A * 6/1998 Ando ................... G07B 15/063
455/106
2004/0135681 A1 7/2004 Tsujita

FOREIGN PATENT DOCUMENTS

| JP | 2004-203225 A | 7/2004 |
|---|---|---|
| JP | 2008-168826 A | 7/2008 |
| JP | 2015-64764 A | 4/2015 |

OTHER PUBLICATIONS

May 16, 2017 International Search Report issued in International Patent Application No. PCT/JP2017/006554.

* cited by examiner

*Primary Examiner* — Nader Bolourchi
(74) *Attorney, Agent, or Firm* — Oliff PLC

(57) ABSTRACT

A communication system that includes a transmitter that wirelessly transmits a signal from a plurality of antennas; a receiver that wirelessly receives a signal; a plurality of targets to which a signal is to be transmitted by the transmitter; a second target to which a signal is to be transmitted by the transmitter; and an electronic control unit that is (Continued)

configured to decide a target to which a signal is to be wirelessly transmitted, from among the plurality of targets.

3 Claims, 7 Drawing Sheets

(51) Int. Cl.
*H04W 4/38* (2018.01)
*H04B 1/3822* (2015.01)
*H04W 4/80* (2018.01)

COMMUNICATION SYSTEM AND COMMUNICATION APPARATUS

This application is the U.S. National Phase of PCT/JP2017/006554 filed Feb. 22, 2017, which claims priority from JP 2016-049875 filed Mar. 14, 2016, the entire disclosure of which is incorporated herein by reference.

BACKGROUND

The present disclosure relates to a communication system in which signals are transmitted to a plurality of devices, and a communication apparatus included in the communication system.

In vehicles, a plurality of electrical devices are connected to an electronic control unit (ECU) via a wire harness. An ECU transmits control signals via a wire harness to a plurality of electrical devices respectively, thereby controlling their operations.

JP 2015-64764A states that foot lamps, interior lamps, and courtesy lamps mounted in a vehicle are connected via wires to an ECU. The ECU transmits control signals respectively to these lamps so that they are individually lit, made to flash, or turned off.

SUMMARY

It is natural that a heavier vehicle requires a larger amount of gasoline or electric power in order to travel the same distance at the same speed, and fuel efficiency is poor. Furthermore, it is preferable that the amount of electric power consumed by devices mounted in a vehicle is small. Thus, a communication system for a vehicle with which an ECU transmits signals to a plurality of vehicle-mounted devices needs to be a light communication system with low electric power consumption.

An exemplary aspect of the disclosure provides a light communication system with low electric power consumption, and a communication apparatus included in the communication system.

A communication system according to the present disclosure includes a transmitter that wirelessly transmits a signal from a plurality of antennas; a receiver that wirelessly receives a signal; a plurality of targets to which a signal is to be transmitted by the transmitter; a second target to which a signal is to be transmitted by the transmitter; and an electronic control unit that is configured to decide a target to which a signal is to be wirelessly transmitted, from among the plurality of targets, wherein: each of the plurality of targets is associated with one of the plurality of antennas in advance, the transmitter transmits a signal to the target decided by the electronic control unit, from the antenna associated with the target, the transmitter repeatedly transmits a request signal requesting that a signal be transmitted, from at least one of the plurality of antennas to the second target, the second target includes a second receiver that wirelessly receives the request signal, and a second transmitter that transmits a specific signal to the receiver when the second receiver receives the request signal, the transmitter stops transmission of a signal to the plurality of targets, from when the request signal is transmitted to when the specific signal is received by the receiver, and content indicated by an instruction by the signal transmitted by the transmitter to the target is different from content requested by the request signal.

According to the present disclosure, each of the plurality of targets is associated with one of the plurality of antennas in advance. For example, each of the plurality of targets is associated with the antenna that is the closest thereto. The electronic control unit decides a target to which a signal is to be wirelessly transmitted, from among the plurality of targets, and transmits a signal to the decided target, from the antenna associated with the target.

Since the plurality of targets does not have to be connected via wires to the electronic control unit, the weight of the system is low. Furthermore, in the case where each of the plurality of targets is associated with the antenna that is the closest thereto, when a signal is transmitted to one target, the antenna that is the closest to the target is used, and thus the signal transmission distance is the shortest. Accordingly, low electric power consumption can be realized.

Furthermore, the electronic control unit repeatedly transmits a request signal, from at least one of the plurality of antennas to the second target. The electronic control unit stops transmission of a signal to the plurality of targets, from when the request signal is transmitted to when the specific signal transmitted by the second target is received. The electronic control unit transmits a signal to the plurality of targets, during a period in which it is not communicating with the second target. Content indicated by an instruction by the signal transmitted to the target is different from content requested by the request signal.

A communication system according to the present disclosure is characterized in that the second target includes a detector that detects air pressure of a tire of a vehicle when the second receiver receives the request signal, and the specific signal is a signal indicating the air pressure detected by the detector.

According to the present disclosure, upon receiving a request signal from the electronic control unit, the second target detects the air pressure of a tire of a vehicle, and transmits a specific signal indicating the detected air pressure to the electronic control unit. The electronic control unit transmits a signal to the plurality of targets while monitoring the air pressure of each of the tires.

A communication apparatus according to the present disclosure includes a transmitter that wirelessly transmits a signal from a plurality of antennas to a plurality of targets; a receiver that wirelessly receives a signal; and an electronic control unit that is configured to decide a target to which a signal is to be wirelessly transmitted, from among the plurality of targets, wherein: each of the plurality of targets is associated with one of the plurality of antennas in advance, the transmitter transmits a signal to the target decided by the electronic control unit, from the antenna associated with the target, the transmitter repeatedly transmits a request signal requesting that a signal be transmitted, from at least one of the plurality of antennas to a second target, the transmitter stops transmission of a signal to the plurality of targets, from when the request signal is transmitted to the second target to when a specific signal transmitted by the second target is received, and content indicated by an instruction by the signal transmitted by the transmitter to the target is different from content requested by the request signal.

According to the present disclosure, each of the plurality of targets is associated with one of the plurality of antennas in advance. A target to which a signal is to be wirelessly transmitted is decided from among the plurality of targets, and a signal is transmitted to the decided target, from an antenna associated with the target.

Thus, the plurality of targets do not have to be connected via wires to the electronic control unit. Furthermore, in the case where each of the plurality of targets is associated with the antenna that is the closest thereto, when a signal is transmitted to one target, the signal is transmitted to the target from the antenna that is the closest to the target.

Furthermore, a request signal is repeatedly transmitted from at least one of the plurality of antennas to the second target. Transmission of a signal to the plurality of targets is stopped from when the request signal is transmitted to when a specific signal transmitted by the second target is received. A signal is transmitted to the plurality of targets during a period in which communication is not performed with the second target. Content indicated by an instruction by the signal transmitted to the target is different from content requested by the request signal.

According to the present disclosure, it is possible to realize a light communication system with low electric power consumption.

DETAILED DESCRIPTION OF EMBODIMENTS

Hereinafter, the present disclosure will be described with reference to the drawings showing an embodiment.

Figure 1:
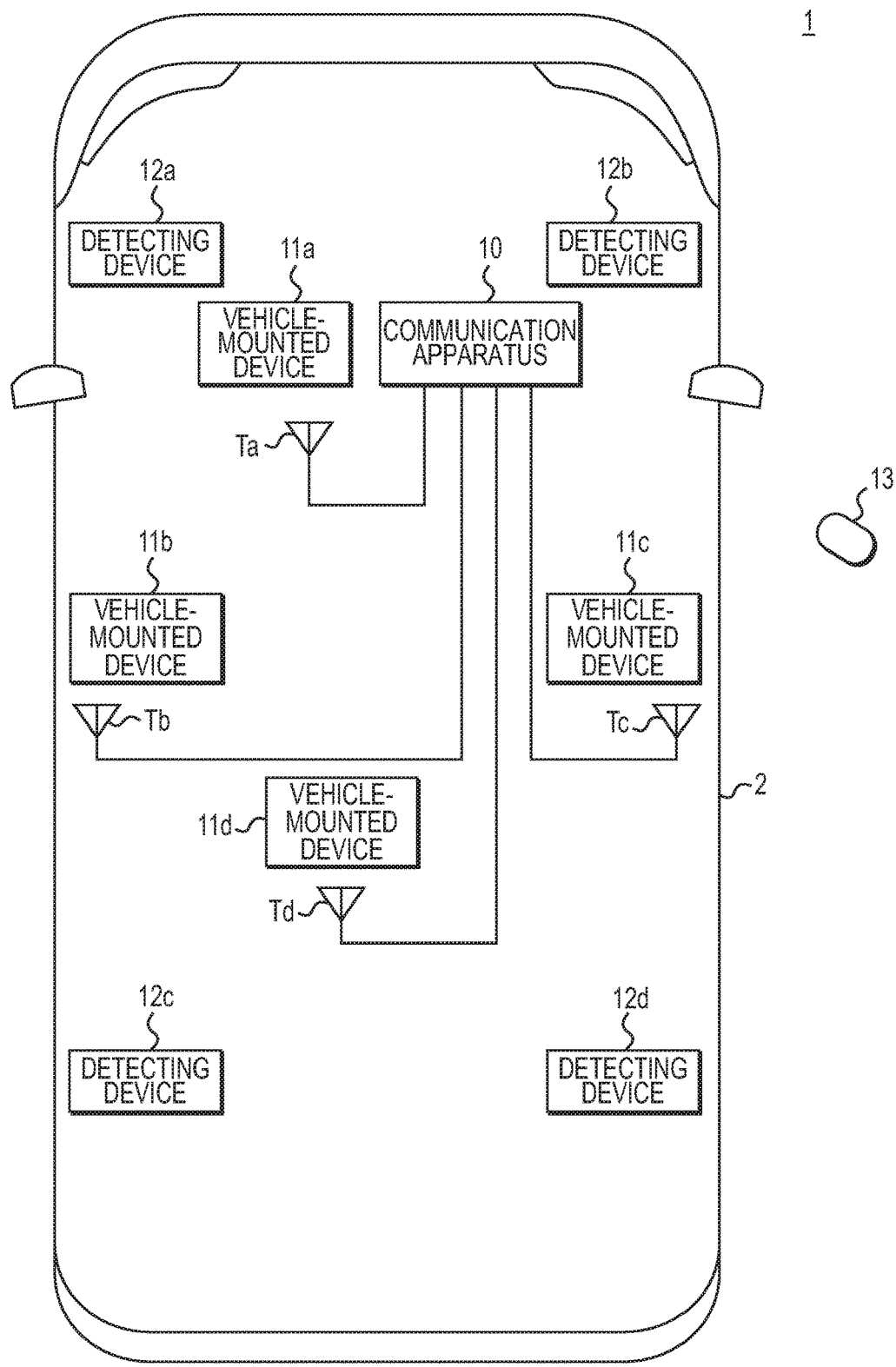
FIG. 1 is a block diagram showing the main configuration of a communication system according to an embodiment.

FIG. 1 is a block diagram showing the main configuration of a communication system 1 according to this embodiment. The communication system 1 includes a communication apparatus 10, four vehicle-mounted devices 11a, 11b, 11c, and 11d, four detecting devices 12a, 12b, 12c, and 12d, a wireless terminal 13, and four transmission antennas Ta, Tb, Tc, and Td. Among these, constituent elements other than the wireless terminal 13 are mounted in a vehicle 2. The transmission antennas Ta, Tb, Tc, and Td are individually connected to the communication apparatus 10.

The communication apparatus 10 is, for example, an ECU, and wirelessly transmits signals from the transmission antennas Ta, Tb, Tc, and Td. The communication apparatus 10 wirelessly transmits an instruction signal making an instruction to the vehicle-mounted devices 11a, 11b, 11c, and 11d to perform various operations. Upon receiving an instruction signal, the vehicle-mounted devices 11a, 11b, 11c, and 11d respectively perform operations indicated by the instruction signal, and wirelessly transmit response signals to the communication apparatus 10. The communication apparatus 10 wirelessly receives the response signals respectively transmitted by the vehicle-mounted devices 11a, 11b, 11c, and 11d.

The vehicle 2 includes four unshown tires. The detecting devices 12a, 12b, 12c, and 12d respectively correspond to the four tires. The detecting devices 12a, 12b, 12c, and 12d respectively detect the air pressure of their corresponding tire. The communication apparatus 10 wirelessly transmits air pressure request signals respectively requesting that the detecting devices 12a, 12b, 12c, and 12d transmit air pressure signals indicating the air pressure of the tires. Upon receiving the air pressure request signals, the detecting devices 12a, 12b, 12c, and 12d respectively detect the air pressure of their corresponding tire, and wirelessly transmit air pressure signals indicating the detected air pressure to the communication apparatus 10.

The wireless terminal 13 is a so-called electronic key, and is carried into and out of the vehicle 2. The communication apparatus 10 wirelessly transmits signals to the wireless terminal 13. Upon wirelessly receiving a signal from the communication apparatus 10, the wireless terminal 13 transmits a signal to the communication apparatus 10. Based on the signals received by the communication apparatus 10 from the wireless terminal 13, operations such as opening and closing doors and starting and stopping an engine are performed.

A signal wirelessly transmitted by the communication apparatus 10 can be generated, for example, by modulating the amplitude of carrier waves. A signal wirelessly received by the communication apparatus 10 can be generated, for example, by modulating the frequency of carrier waves.

Figure 2:
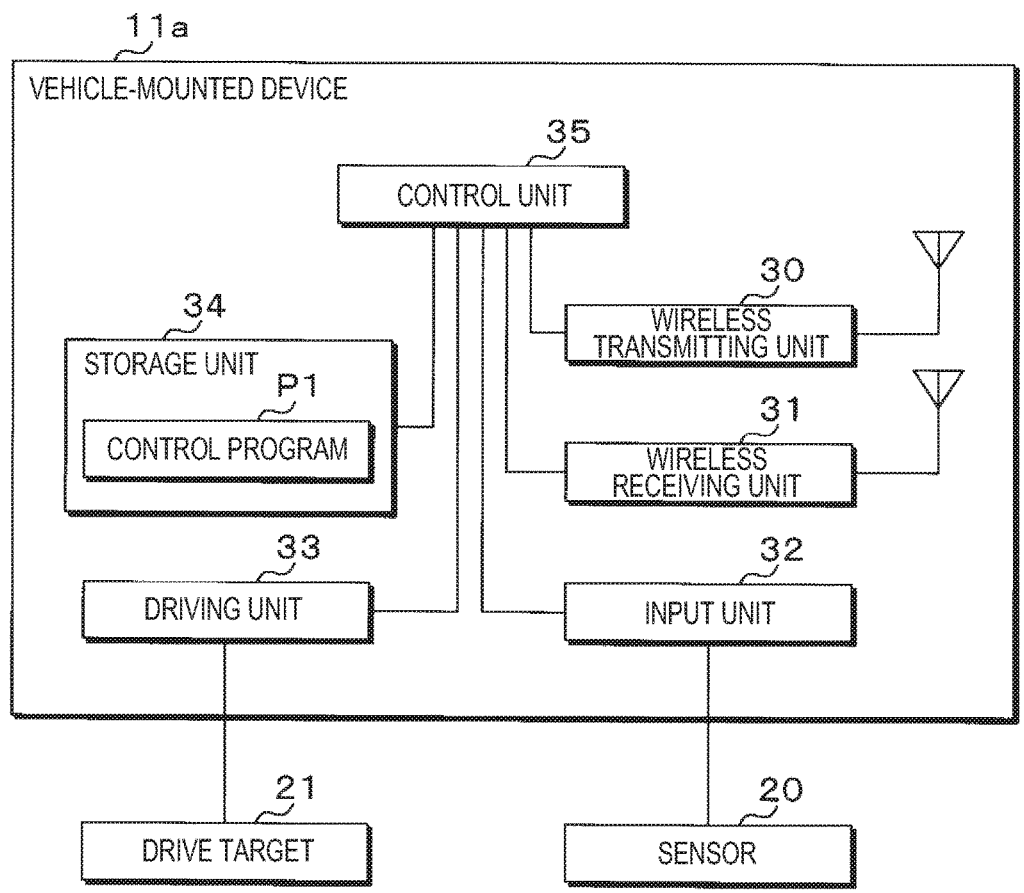
FIG. 2 is a block diagram showing the main configuration of a vehicle-mounted device.

FIG. 2 is a block diagram showing the main configuration of the vehicle-mounted device 11a. The vehicle-mounted device 11a includes a wireless transmitting unit 30, a wireless receiving unit 31, an input unit 32, a driving unit 33, a storage unit 34, and a control unit 35. The wireless transmitting unit 30, the wireless receiving unit 31, the input unit 32, the driving unit 33, and the storage unit 34 are individually connected to the control unit 35. The input unit 32 is also connected to a sensor 20. The driving unit 33 is connected to a drive target 21. The sensor 20 and the drive target 21 are also mounted in the vehicle 2.

The sensor 20 detects the speed or acceleration of the vehicle 2, the brightness outside the vehicle 2, or the like. The sensor 20 outputs sensor information indicating a detected detection value to the input unit 32. The sensor information input to the input unit 32 is acquired by the control unit 35. The detection value indicated by the sensor information acquired by the control unit 35 from the input unit 32 substantially matches the detection value detected by the sensor 20 at the time of acquisition.

The drive target 21 is an electrical device such as a lamp or a motor. The driving unit 33 drives the drive target 21 and stops the driving in response to an instruction from the control unit 35.

The wireless transmitting unit 30 transmits a response signal to the communication apparatus 10 in response to an instruction from the control unit 35.

The wireless receiving unit 31 receives an instruction signal.

The storage unit 34 stores a control program P1.

The control unit 35 includes a central processing unit (CPU), and performs driving processing that drives the drive target 21, stopping processing that stops driving the drive target 21, and acquiring processing that acquires sensor information, by executing the control program P1.

When the wireless receiving unit 31 receives an instruction signal making an instruction to drive the drive target 21, the control unit 35 performs driving processing. In the driving processing, the control unit 35 instructs the driving unit 33 to drive the drive target 21. Next, the control unit 35 instructs the wireless transmitting unit 30 to transmit a response signal indicating that the drive target 21 has been driven, to the communication apparatus 10, and ends the driving processing.

When the wireless receiving unit 31 receives an instruction signal making an instruction to stop driving the drive target 21, the control unit 35 performs stopping processing. In the stopping processing, the control unit 35 instructs the driving unit 33 to stop driving the drive target 21. Next, the control unit 35 instructs the wireless transmitting unit 30 to transmit a response signal indicating that driving of the drive target 21 has stopped, to the communication apparatus 10, and ends the stopping processing.

When the wireless receiving unit 31 receives an instruction signal making an instruction to acquire sensor information, the control unit 35 performs acquiring processing. In the acquiring processing, the control unit 35 acquires sensor information from the input unit 32. Next, the control unit 35 instructs the wireless transmitting unit 30 to transmit a response signal containing the sensor information acquired from the input unit 32, to the communication apparatus 10, and ends the acquiring processing.

The sensor 20 and the drive target 21 mounted in the vehicle 2 are also connected to each of the vehicle-mounted devices 11b, 11c, and 11d. Each of the vehicle-mounted devices 11b, 11c, and 11d is configured similar to the vehicle-mounted device 11a. Thus, a detailed description thereof has been omitted.

Note that the sensors 20 respectively connected to the vehicle-mounted devices 11a, 11b, 11c, and 11d are different from each other, and the drive targets 21 respectively connected to the vehicle-mounted devices 11a, 11b, 11c, and 11d are different from each other.

Figure 3:
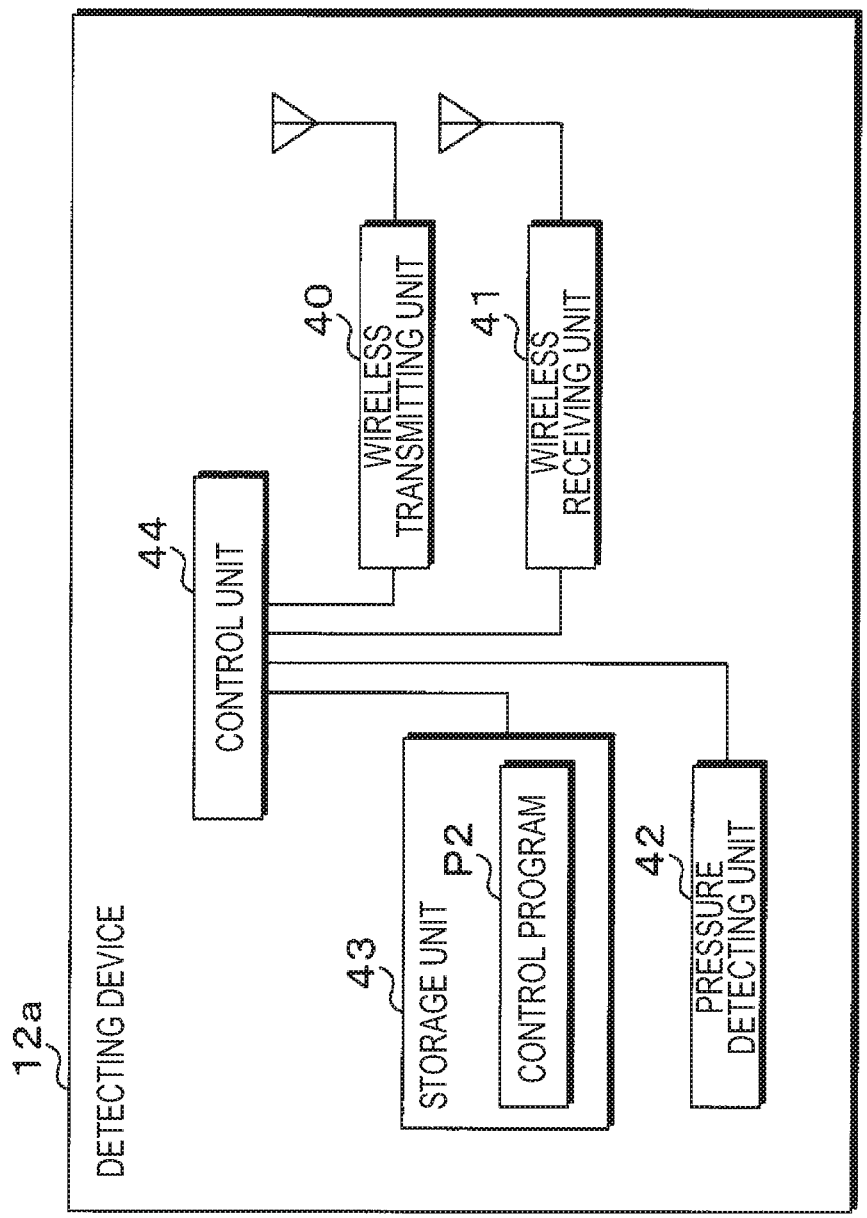
FIG. 3 is a block diagram showing the main configuration of a detecting device.

FIG. 3 is a block diagram showing the main configuration of the detecting device 12a. The detecting device 12a includes a wireless transmitting unit 40, a wireless receiving unit 41, a pressure detecting unit 42, a storage unit 43, and a control unit 44. The wireless transmitting unit 40, the wireless receiving unit 41, the pressure detecting unit 42, and the storage unit 43 are individually connected to the control unit 44.

The wireless transmitting unit 40 wirelessly transmits the air pressure signal to the communication apparatus 10 in response to an instruction from the control unit 44.

The wireless receiving unit 41 wirelessly receives the air pressure request signal. The wireless receiving unit 41 functions as a second receiving unit.

The pressure detecting unit 42 detects the air pressure of the tire of the vehicle 2 corresponding to the detecting device 12a in response to an instruction from the control unit 44.

The storage unit 43 stores a control program P2.

The control unit 44 includes a CPU, and performs various types of processing by executing the control program P2. Specifically, when the wireless receiving unit 41 receives the air pressure request signal, the control unit 44 instructs the pressure detecting unit 42 to detect the air pressure of the tire of the vehicle 2. Next, the control unit 44 instructs the wireless transmitting unit 40 to transmit the air pressure signal indicating the air pressure detected by the pressure detecting unit 42, to the communication apparatus 10. The air pressure signal corresponds to a specific signal, and the wireless transmitting unit 40 functions as a second transmitting unit.

Each of the detecting devices 12b, 12c, and 12d is configured similar to the detecting device 12a. Thus, a detailed description thereof has been omitted.

Note that the pressure detecting unit 42 of each of the detecting devices 12b, 12c, and 12d detects the air pressure of the tire corresponding to the detecting device having that pressure detecting unit 42 and not the tire corresponding to the detecting device 12a.

Figure 4:
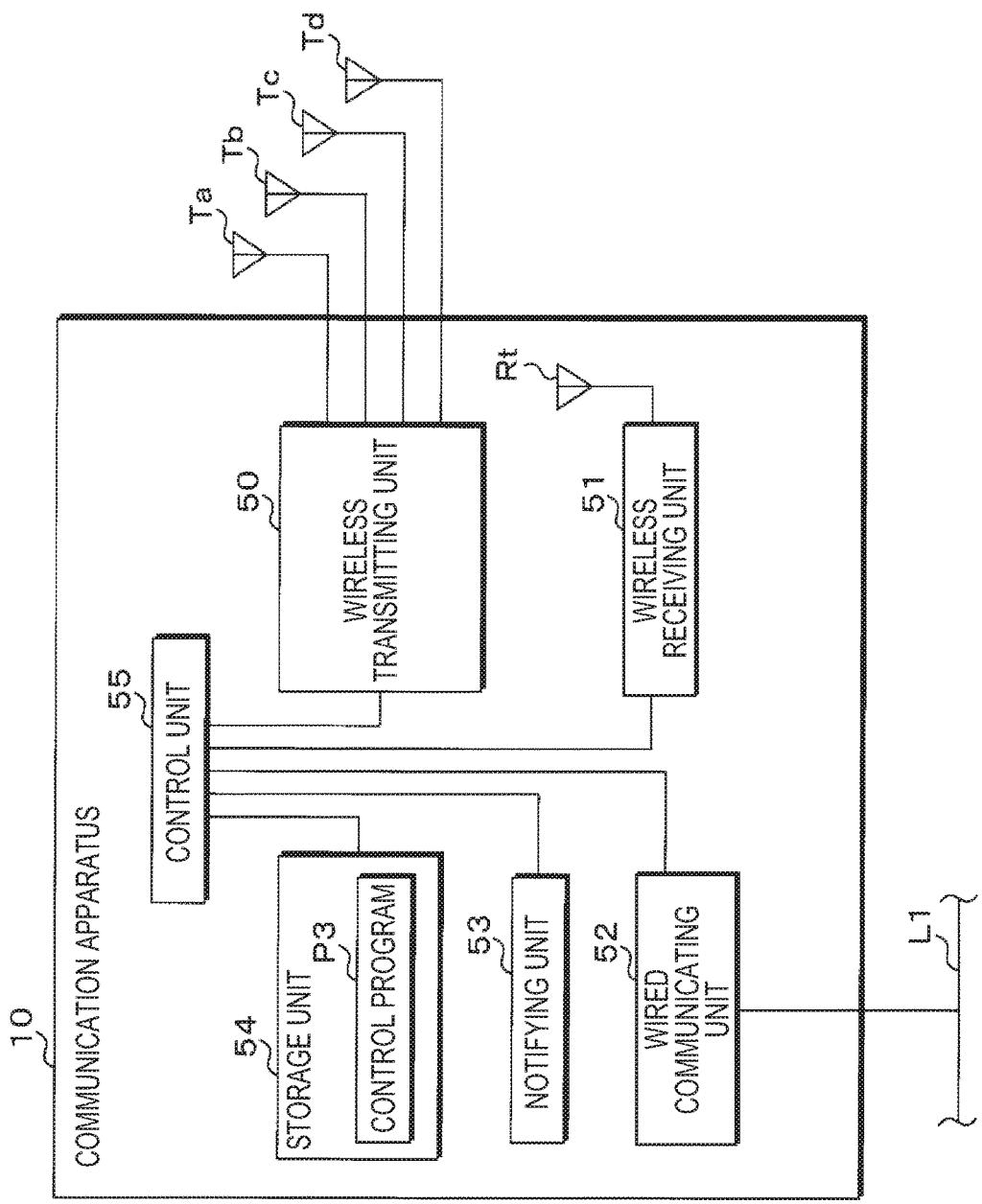
FIG. 4 is a block diagram showing the main configuration of a communication apparatus.

FIG. 4 is a block diagram showing the main configuration of the communication apparatus 10. The communication apparatus 10 includes a wireless transmitting unit 50, a wireless receiving unit 51, a wired communicating unit 52, a notifying unit 53, a storage unit 54, a control unit 55, and a receiving antenna Rt. The wireless transmitting unit 50, the wireless receiving unit 51, the wired communicating unit 52, the notifying unit 53, and the storage unit 54 are individually connected to the control unit 55. The wireless transmitting unit 50 is also connected to each of the four transmission antennas Ta, Tb, Tc, and Td. The wireless receiving unit 51 is also connected to the receiving antenna Rt. The wired communicating unit 52 is also connected to a communication line L1 arranged inside the vehicle 2. Various devices as well as the wired communicating unit 52 are connected to the communication line L1.

The wireless transmitting unit 50 wirelessly transmits a signal from at least one of the four transmission antennas Ta, Tb, Tc, and Td, to the wireless receiving units 31 of the corresponding vehicle-mounted devices 11a, 11b, 11c, and 11d, the wireless receiving units 41 of the corresponding detecting devices 12a, 12b, 12c, and 12d, and the wireless terminal 13, in response to an instruction from the control unit 55. The wireless transmitting unit 50 transmits the above-described instruction signal and air pressure request signal.

Each of the vehicle-mounted devices 11a, 11b, 11c, and 11d corresponds to a target, and each of the detecting devices 12a, 12b, 12c, and 12d corresponds to a second target.

The wireless receiving unit 51 wirelessly receives a signal via the receiving antenna Rt. The wireless receiving unit 51 receives the above-described response signal and air pressure signal.

The wired communicating unit 52 receives, via the communication line L1, an operation request signal requesting that at least one of the vehicle-mounted devices 11a, 11b, 11c, and 11d perform various operations, and an ignition signal indicating that the ignition switch of the vehicle 2 is turned on or off. The operation request signal is a signal requesting that the drive target 21 connected to the vehicle-mounted device 11a be driven or that the driving be stopped, or a signal requesting that sensor information of the sensor 20 connected to the vehicle-mounted device 11b be acquired. The ignition signal is transmitted to the wired communicating unit 52 each time the ignition switch is turned on or off. Furthermore, the wired communicating unit 52 transmits a signal via the communication line L1 in response to an instruction from the control unit 55.

Figure 5:
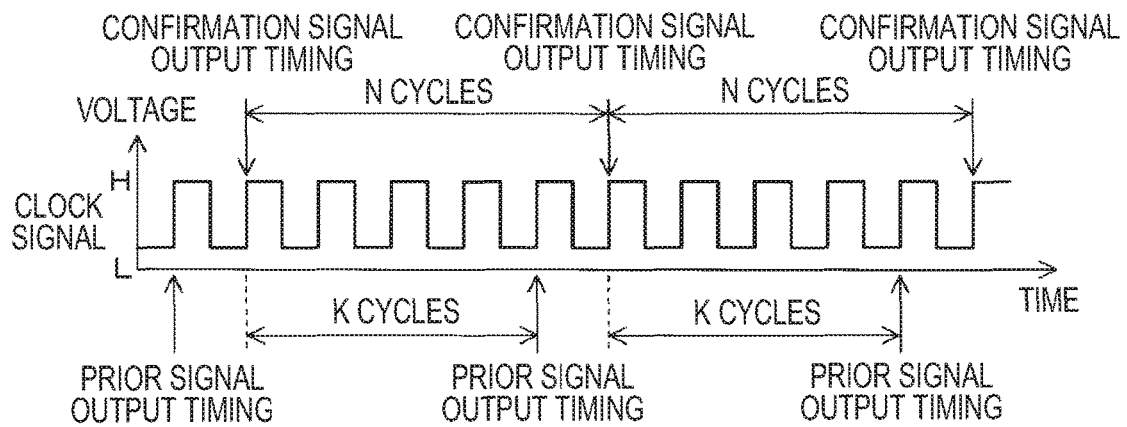
FIG. 5 is an explanatory diagram of an operation of a notifying unit.

FIG. 5 is an explanatory diagram of an operation of the notifying unit 53. A clock signal constituted by a high-level voltage and a low-level voltage is input to the notifying unit 53. FIG. 5 shows a waveform of the clock signal. In FIG. 5, "H" indicates a high-level voltage, and "L" indicates a low-level voltage. In the clock signal, the voltage transitions from the low-level voltage to the high-level voltage at constant cycles.

The notifying unit 53 outputs a confirmation signal making an instruction to confirm the air pressure of each of the tires to the control unit 55. The notifying unit 53 further outputs a prior signal indicating output of a confirmation signal in advance to the control unit 55. FIG. 5 shows an output timing at which the notifying unit 53 outputs a confirmation signal to the control unit 55 and an output timing at which the notifying unit 53 outputs a prior signal to the control unit 55.

As shown in FIG. 5, the notifying unit 53 outputs a confirmation signal to the control unit 55 every time N cycles (N is an integer of 2 or more) of the clock signal have elapsed. Furthermore, the notifying unit 53 outputs a prior signal to the control unit 55 when K cycles (K is a natural number less than N) of the clock signal have elapsed from when the confirmation signal is output.

FIG. 5 shows an example in which N is 5, and K is 4. It is natural that N is not limited to 5, and K is not limited to 4.

The storage unit 54 stores a control program P3. The storage unit 54 further stores flag values. The flag value is set by the control unit 55 to 0 or 1.

The control unit 55 includes a CPU, and performs pre-processing that is performed before confirming the air pressure of each of the tires, confirmation processing that confirms the air pressure of each of the tires, control processing that controls an operation of at least one of the vehicle-mounted devices 11a, 11b, 11c, and 11d, and specification processing that specifies the position of the wireless terminal 13, by executing the control program P3.

Figure 6:
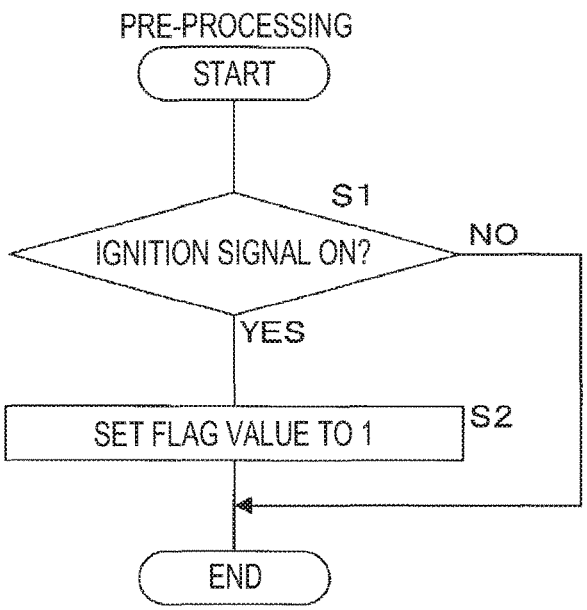
FIG. 6 is a flowchart showing the procedure of pre-processing.

FIG. 6 is a flowchart showing the procedure of pre-processing. A prior signal and a confirmation signal are input to the control unit 55 from the notifying unit 53. When a prior signal is input from the notifying unit 53, the control unit 55 performs pre-processing. First, the control unit 55 determines whether or not the ignition switch of the vehicle 2 is on, based on the latest ignition signal received by the wired communicating unit 52 (Step S1).

In Step S1, if the latest ignition signal indicates that the ignition switch has been turned on, the control unit 55 determines that the ignition switch is on. Furthermore, if the latest ignition signal indicates that the ignition switch has been turned off, the control unit 55 determines that the ignition switch is off.

If it is determined that the ignition switch is on (S1: YES), the control unit 55 sets the flag value to 1 (Step S2). If it is determined that the ignition switch is not on, that is, the ignition switch is off (S1: NO), the control unit 55 performs Step S2 and then ends the pre-processing.

Figure 7:
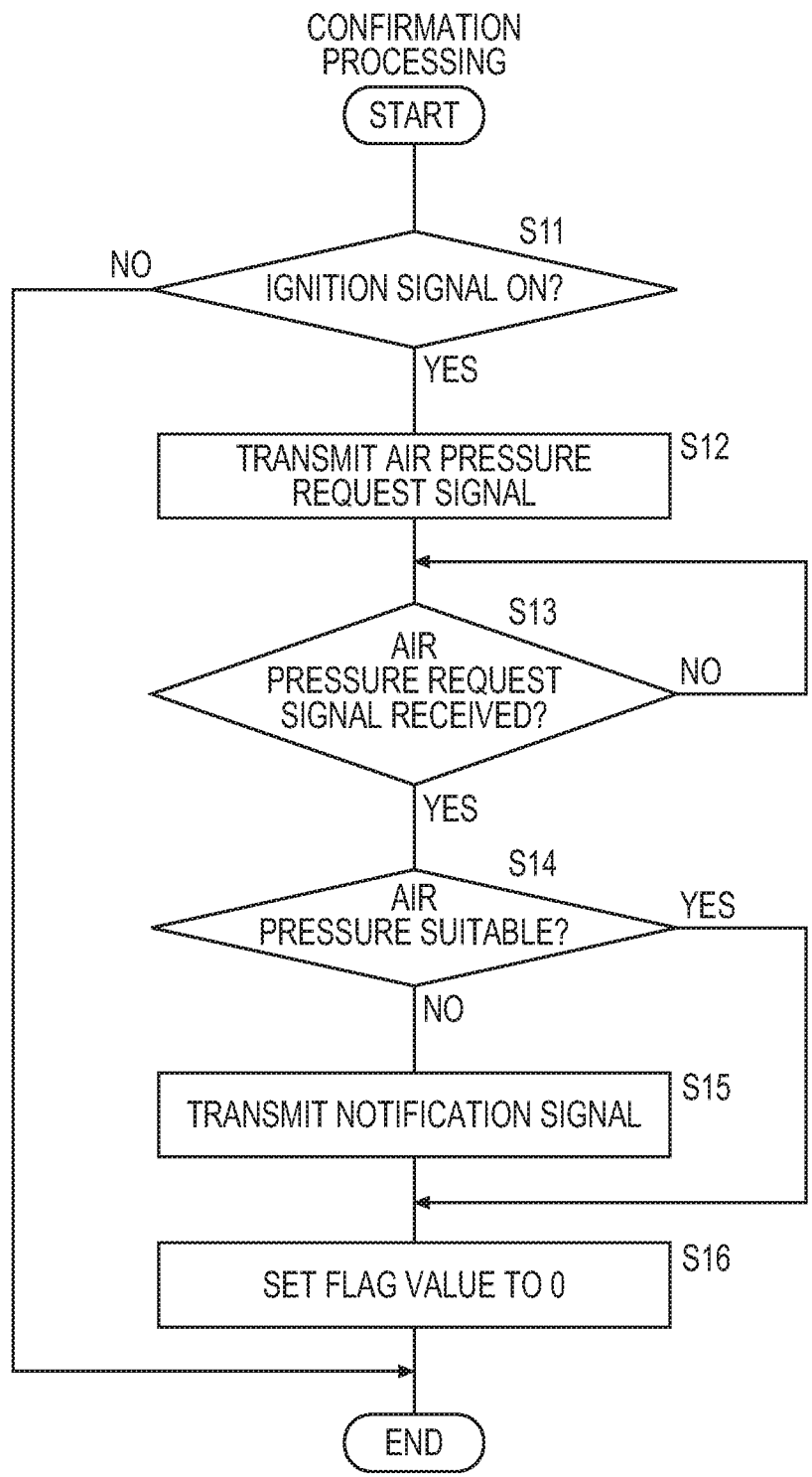
FIG. 7 is a flowchart showing the procedure of confirmation processing.

FIG. 7 is a flowchart showing the procedure of confirmation processing. When a confirmation signal is input from the notifying unit 53, the control unit 55 performs confirmation processing. First, the control unit 55 determines whether or not the ignition switch is on, as in Step S1 of the pre-processing (Step S11).

If it is determined that the ignition switch is on (S11: YES), the control unit 55 instructs the wireless transmitting unit 50 to transmit an air pressure request signal from at least one of the transmission antennas Ta, Tb, Tc, and Td, for example, the transmission antennas Tb and Tc, to the four detecting devices 12a, 12b, 12c, and 12d (Step S12). When the wireless receiving unit 41 receives the air pressure request signal, in each of the detecting devices 12a, 12b, 12c, and 12d, the control unit 44 performs the above-described processing regarding detection of the air pressure. In this processing, the pressure detecting unit 42 detects the air pressure of the tire, and the wireless transmitting unit 40 wirelessly transmits an air pressure signal indicating the air pressure detected by the pressure detecting unit 42, to the wireless receiving unit 51 of the communication apparatus 10.

As described above, the notifying unit 53 outputs a confirmation signal to the control unit 55 every time N cycles of the clock signal have elapsed, and the control unit 55 performs confirmation processing every time a confirmation signal is input from the notifying unit 53. In the confirmation processing, if the ignition switch is on, Step S12 is performed. Thus, if the ignition switch is on, the control unit 55 repeatedly performs Step S12, and the wireless transmitting unit 50 repeatedly transmits a request signal to the four detecting devices 12a, 12b, 12c, and 12d.

After performing Step S12, the control unit 55 determines whether or not the wireless receiving unit 51 has received four air pressure signals from the respective wireless transmitting units 40 of the detecting devices 12a, 12b, 12c, and 12d (Step S13). If it is determined that the wireless receiving unit 51 has not received four air pressure signals (S13: NO), the control unit 55 performs Step S13 again, and waits until the wireless receiving unit 51 has received the four air pressure signals.

If it is determined that the wireless receiving unit 51 has received four air pressure signals (S13: YES), the control unit 55 determines whether or not four air pressures respectively indicated by the four air pressure signals are suitable (Step S14). In Step S14, if all of the four air pressures are respectively the same as or greater than preset reference values, the control unit 55 determines that the four air pressures are suitable. If at least one of the four air pressures is less than the corresponding reference value, the control unit 55 determines that the four air pressures are not suitable. The reference values are stored in the storage unit 54.

Note that the four reference values used for determining the four air pressures do not have to be the same. For example, it is also possible that the same first reference value is used as a reference value used for determining the air pressure of each of the two tires arranged on the front side of the vehicle 2, the same second reference value is used as a reference value used for determining the air pressure of each of the two tires arranged on the rear side of the vehicle 2, and the first reference value and the second reference value are different from each other.

If it is determined that the four air pressures are not suitable (S14: NO), the control unit 55 instructs the wired communicating unit 52 to transmit a notification signal indicating that at least one of the four air pressures is not suitable, via the communication line L1 (Step S15). The device that has received the notification signal indicates that the air pressure is not suitable, for example, by turning on an unshown lamp or displaying a message on an unshown display unit.

If it is determined that the four air pressures are suitable (S14: YES) or after Step S15 is performed, the control unit 55 sets the flag value to 0 (Step S16). If it is determined that the ignition switch is off (S11: NO) or after Step S16 is performed, the control unit 55 ends the confirmation processing.

As described above, the flag value is set to 1 in the pre-processing, and the flag value is set to 0 in the confirmation processing. In the case where the ignition switch is on, the flag value 0 means that the current point in time is in a period from when the confirmation processing is ended to when the pre-processing is started, and the flag value 1 means that the current point in time is in a period from when the pre-processing is started to when the confirmation processing is ended.

Figures 8, 9:
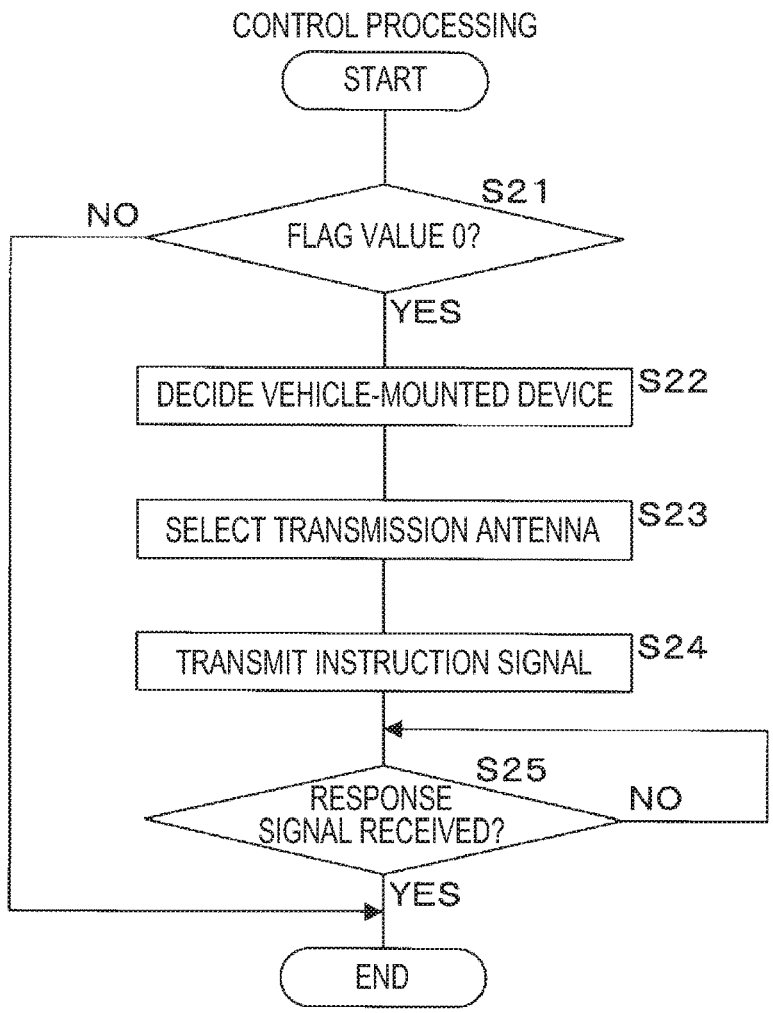
FIG. 8 is a flowchart showing the procedure of control processing.
FIG. 9 is a table showing an association relationship between vehicle-mounted devices and transmission antennas.

FIG. 8 is a flowchart showing the procedure of control processing. When the wired communicating unit 52 receives an operation request signal, the control unit 55 of the communication apparatus 10 performs control processing. First, the control unit 55 determines whether or not the flag value is 0 (Step S21). If it is determined that the flag value is 0 (S21: YES), the control unit 55 decides a vehicle-mounted device to which an instruction signal is to be wirelessly transmitted, from among the four vehicle-mounted devices 11a, 11b, 11c, and 11d, based on the operation request signal received by the wired communicating unit 52 (Step S22). The control unit 55 functions as a deciding unit.

As an example, in the case where the drive target 21 connected to the vehicle-mounted device 11a is a motor for opening and closing a power window, if the operation request signal is a signal requesting that a power window be opened, the control unit 55 decides the vehicle-mounted device 11a as a vehicle-mounted device to which an instruction signal is to be transmitted. Furthermore, as another example, in the case where the sensor 20 connected to the vehicle-mounted device 11b is configured to detect a vehicle speed, if the operation request signal is a signal requesting that sensor information indicating a vehicle speed be acquired, the control unit 55 decides the vehicle-mounted device 11b as a vehicle-mounted device to which an instruction signal is to be transmitted.

Next, the control unit 55 selects a transmission antenna associated with the vehicle-mounted device decided in Step S22, from among the transmission antennas Ta, Tb, Tc, and Td (Step S23). Each of the four vehicle-mounted devices 11a, 11b, 11c, and 11d is associated with one of the four transmission antennas Ta, Tb, Tc, and Td in advance. The storage unit 54 stores an association relationship between the vehicle-mounted devices 11a, 11b, 11c, and 11d and the transmission antennas Ta, Tb, Tc, and Td.

FIG. 9 is a table showing an association relationship between the vehicle-mounted devices 11a, 11b, 11c, and 11d and the transmission antennas Ta, Tb, Tc, and Td. As shown in FIG. 9, the vehicle-mounted devices 11a, 11b, 11c, and 11d are respectively associated with the transmission antennas Ta, Tb, Tc, and Td. Each of the vehicle-mounted devices 11a, 11b, 11c, and 11d is associated with the transmission antenna that is the closest thereto, among the transmission antennas Ta, Tb, Tc, and Td. This association relationship is stored in the storage unit 54. Specifically, information indicating one of the vehicle-mounted devices 11a, 11b, 11c, and 11d is associated with one of the pieces of information respectively indicating the transmission antennas Ta, Tb, Tc, and Td. In Step S23, a transmission antenna is selected from among the transmission antennas Ta, Tb, Tc, and Td, based on the association relationship stored in the storage unit 54.

Next, the control unit 55 instructs the wireless transmitting unit 50 to transmit an instruction signal from the transmission antenna selected in Step S23 to the vehicle-mounted device decided in Step S22 (Step S24). The content of the instruction signal is based on the content of the operation request signal received by the wired communicating unit 52. If the operation request signal is a signal requesting that the drive target 21 be driven or that the driving be stopped, the instruction signal is a signal making an instruction to drive the drive target 21 or to stop the driving. If the operation request signal is a signal requesting that sensor information be acquired, the instruction signal is a signal making an instruction to acquire sensor information.

As described above, in each of the vehicle-mounted devices 11a, 11b, 11c, and 11d, when the wireless receiving unit 31 receives an instruction signal making an instruction to drive the drive target 21, the control unit 35 performs driving processing. The driving unit 33 drives the drive target 21, and the wireless transmitting unit 30 wirelessly transmits a response signal indicating that the drive target 21 has been driven, to the wireless receiving unit 51 of the communication apparatus 10.

Furthermore, when the wireless receiving unit 31 receives an instruction signal making an instruction to stop driving the drive target 21, the control unit 35 performs stopping processing. The driving unit 33 stops driving the drive target 21. The driving unit 33 stops driving the drive target 21, and the wireless transmitting unit 30 wirelessly transmits a response signal indicating that driving of the drive target 21 has stopped, to the wireless receiving unit 51 of the communication apparatus 10.

Furthermore, when the wireless receiving unit 31 receives an instruction signal making an instruction to acquire sensor information of the sensor 20, the control unit 55 performs acquiring processing, thereby acquiring sensor information input from the sensor 20 to the input unit 32. The wireless transmitting unit 30 wirelessly transmits a response signal containing the sensor information acquired by the control unit 55, to the wireless receiving unit 51 of the communication apparatus 10.

After performing Step S24, the control unit 55 determines whether or not the wireless receiving unit 51 has received the response signal (Step S25). If it is determined that the wireless receiving unit 51 has not received the response signal (S25: NO), the control unit 55 performs Step S25 again, and waits until the wireless receiving unit 51 has received the response signal.

If it is determined that the flag value is not 0, that is, the flag value is 1 (S21: NO), or it is determined that the wireless receiving unit 51 has received the response signal (S25: YES), the control unit 55 ends the control processing.

The control unit 55 performs various types of processing, based on the response signal received by the wireless receiving unit 51. If the response signal contains sensor information, for example, the control unit 55 instructs the wired communicating unit 52 to transmit a signal containing the sensor information, via the communication line L1. Accordingly, the device that has transmitted an operation request signal requesting that sensor information be acquired is notified of the sensor information.

Note that the number of vehicle-mounted devices decided by the control unit 55 in Step S22 of the control processing is not limited to one, and may be two or more. In this case, in Step S23, the control unit 55 selects one or a plurality of transmission antennas respectively associated with the plurality of vehicle-mounted devices decided in Step S22. In Step S24, the control unit 55 instructs the wireless transmitting unit 50 to wirelessly transmit an instruction signal from the one or plurality of transmission antennas selected in Step S23. In Step S25, the control unit 55 determines whether or not the wireless receiving unit 51 has received a response signal from all of the plurality of vehicle-mounted devices decided in Step S22.

The wired communicating unit 52 of the communication apparatus 10 receives a specification signal making an instruction to specify the position of the wireless terminal 13, via the communication line L1. When the wired communicating unit 52 receives the specification signal, the control unit 55 performs specification processing. In the specification processing, if the flag value is 1, the control unit 55 does not specify the position of the wireless terminal 13. Furthermore, if the flag value is 0, the control unit 55 causes the wireless transmitting unit 50 to wirelessly transmit a signal to the wireless terminal 13, and specifies the position of the wireless terminal 13 based on whether or not the wireless receiving unit 51 has received a signal from the wireless terminal 13.

For example, the control unit 55 instructs the wireless transmitting unit 50 to transmit a signal from the transmission antenna Td to the wireless terminal 13. If the wireless receiving unit 51 receives a signal from the wireless terminal 13 due to this transmission, the control unit 55 determines that the wireless terminal 13 is positioned inside the vehicle 2. If the wireless receiving unit 51 does not receive a signal from the wireless terminal 13, the control unit 55 instructs the wireless transmitting unit 50 to transmit a signal from the transmission antennas Tb and Tc to the wireless terminal 13. If the wireless receiving unit 51 receives a signal from the wireless terminal 13 due to this transmission, the control unit 55 determines that the wireless terminal 13 is positioned outside the vehicle 2 at a location close to the vehicle 2. If the wireless receiving unit 51 does not receive a signal from the wireless terminal 13, the control unit 55 determines that the wireless terminal 13 is positioned at a location considerably far from the vehicle 2. Based on the determination result regarding the position of the wireless terminal 13, for example, the engine of the vehicle 2 is started or stopped, or a door of the vehicle 2 is opened or closed.

In the communication system 1, the four vehicle-mounted devices 11a, 11b, 11c, and 11d do not have to be connected via wires to the communication apparatus 10. Thus, the weight of the communication system 1 is low, and the production cost of the communication system 1 is low. Furthermore, since wiring is not necessary, it is easy to install an additional vehicle-mounted device. Furthermore, when the communication apparatus 10 transmits a signal to one of the four vehicle-mounted devices 11a, 11b, 11c, and 11d, the transmission antenna that is the closest to the vehicle-mounted device, from among the four transmission antennas Ta, Tb, Tc, and Td, is used, and thus the signal transmission distance is the shortest. Thus, low electric power consumption can be realized in the communication system 1.

Furthermore, in the control processing, if the flag value is 1, the control unit 55 of the communication apparatus 10 does not perform Step S24, and the wireless transmitting unit 50 does not wirelessly transmit an instruction signal to the vehicle-mounted devices 11a, 11b, 11c, and 11d. In other words, if the ignition switch is on, the wireless transmitting unit 50 stops transmission of an instruction signal to the vehicle-mounted devices 11a, 11b, 11c, and 11d in a period from when the pre-processing is started to when the confirmation processing is ended. This period includes a period from when the wireless transmitting unit 50 of the communication apparatus 10 transmits the air pressure request signal to when the wireless receiving unit 51 receives the air pressure signal.

During a period in which the control unit 55 of the communication apparatus 10 is not performing the confirmation processing, that is, during a period in which the communication apparatus 10 is not communicating with any of the detecting devices 12a, 12b, 12c, and 12d, the control unit 55 performs the control processing, and the wireless transmitting unit 50 wirelessly transmits an instruction signal to the vehicle-mounted devices 11a, 11b, 11c, and 11d.

The air pressure of the tires is a parameter necessary to realize safe travel of the vehicle 2. Thus, the confirmation processing that confirms the air pressure of each of the tires is preferably performed reliably by the control unit 55 in the case where the notifying unit 53 of the communication apparatus 10 outputs a confirmation signal to the control unit 55.

In the communication system 1, the period from when the notifying unit 53 outputs a prior signal to when the notifying unit 53 outputs a confirmation signal is longer than the longest time taken by the control unit 55 to perform the control processing, and is longer than the longest time taken to perform the specification processing. Thus, even if the wired communicating unit 52 receives an operation request signal or a specification signal immediately before the notifying unit 53 outputs a prior signal to the control unit 55, the confirmation processing is reliably performed when the confirmation signal is output from the notifying unit 53.

The control unit 55 of the communication apparatus 10 instructs the wireless transmitting unit 50 to transmit an instruction signal to the four vehicle-mounted devices 11a, 11b, 11c, and 11d, while monitoring the air pressure of each of the four tires of the vehicle 2.

Note that the number of detecting devices included in the communication system 1 is not limited to four. The number of detecting devices is the same as the number of tires of the vehicle 2. Accordingly, the number of detecting devices is changed in accordance with the number of tires included in the vehicle 2. Furthermore, the detecting devices are not limited to devices that detect the air pressure of the tires, and may be any device that repeatedly communicates with the communication apparatus 10. In this case, the number of detecting devices may be one, two, three, or five or more. The detecting devices may be, for example, a device that detects the temperature of a fluid flowing inside the radiator of the vehicle 2.

Furthermore, the association relationship stored in the storage unit 54 may be such that the vehicle-mounted devices 11a, 11b, 11c, and 11d are associated with the transmission antennas Ta, Tb, Tc, and Td not based on distance but based on the receiving intensity at which a signal is received from the transmission antennas. For example, when signals at the same intensity are transmitted respectively from the transmission antennas Ta, Tb, Tc, and Td, each of the vehicle-mounted devices 11a, 11b, 11c, and 11d may be associated with a transmission antenna from which a signal with the highest intensity is received by the wireless receiving unit 31.

Furthermore, the transmission antennas respectively associated with the vehicle-mounted devices 11a, 11b, 11c, and 11d may not be different from each other. For example, the vehicle-mounted devices 11a and 11b may be associated with the transmission antenna Ta.

Furthermore, both the sensor 20 and the drive target 21 may not be connected to each of the vehicle-mounted devices 11a, 11b, 11c, and 11d. It is sufficient that at least one of the sensor 20 and the drive target 21 is connected to each of the vehicle-mounted devices 11a, 11b, 11c, and 11d.

Furthermore, the number of vehicle-mounted devices and the number of transmission antennas included in the communication system 1 are not limited to four, and may be two, three, or five or more. Furthermore, the number of vehicle-mounted devices may be different from the number of transmission antennas.

Furthermore, the notifying unit 53 of the communication apparatus 10 may not periodically output a confirmation signal to the control unit 55. It is sufficient that the notifying unit 53 is configured to repeatedly transmit a confirmation signal.

The presently disclosed embodiment is considered in all respects to be illustrative and not restrictive. The scope of the disclosure is indicated by the appended claims rather than the foregoing description, and all changes that come within the meaning and range of equivalence thereof are intended to be embraced therein.

The invention claimed is:

1. A communication system comprising:
a transmitter that wirelessly transmits a signal from a plurality of antennas;
a receiver that wirelessly receives a signal;
a plurality of targets to which a signal is to be transmitted by the transmitter;
a second target to which a signal is to be transmitted by the transmitter; and
an electronic control unit that is configured to decide a target to which a signal is to be wirelessly transmitted, from among the plurality of targets, wherein:
each of the plurality of targets is associated with one of the plurality of antennas in advance,
the transmitter transmits a signal to the target decided by the electronic control unit, from the antenna associated with the target,
the transmitter repeatedly transmits a request signal requesting that a signal be transmitted, from at least one of the plurality of antennas to the second target,
the second target includes
a second receiver that wirelessly receives the request signal, and
a second transmitter that transmits a specific signal to the receiver when the second receiver receives the request signal,
the transmitter stops transmission of a signal to the plurality of targets, from when the request signal is transmitted to when the specific signal is received by the receiver, and
content indicated by an instruction by the signal transmitted by the transmitter to the target is different from content requested by the request signal.

2. The communication system according to claim 1, wherein the second target includes a detector that detects air pressure of a tire of a vehicle when the second receiver receives the request signal, and
the specific signal is a signal indicating the air pressure detected by the detector.

3. A communication apparatus comprising:
a transmitter that wirelessly transmits a signal from a plurality of antennas to a plurality of targets;
a receiver that wirelessly receives a signal; and
an electronic control unit that is configured to decide a target to which a signal is to be wirelessly transmitted, from among the plurality of targets, wherein:
each of the plurality of targets is associated with one of the plurality of antennas in advance,
the transmitter transmits a signal to the target decided by the electronic control unit, from the antenna associated with the target,
the transmitter repeatedly transmits a request signal requesting that a signal be transmitted, from at least one of the plurality of antennas to a second target,
the transmitter stops transmission of a signal to the plurality of targets, from when the request signal is transmitted to the second target to when a specific signal transmitted by the second target is received, and
content indicated by an instruction by the signal transmitted by the transmitter to the target is different from content requested by the request signal.

* * * * *